UNITED STATES PATENT OFFICE.

JOHN A. VAN KEUREN, OF BRIDGEPORT, CONNECTICUT, ASSIGNOR OF ONE-HALF TO LOUIS N. VAN KEUREN, OF SAME PLACE.

WATER-PROOF PRESERVATIVE BLACKING.

SPECIFICATION forming part of Letters Patent No. 272,606, dated February 20, 1883.

Application filed December 30, 1882. (No specimens.)

*To all whom it may concern:*

Be it known that I, JOHN A. VAN KEUREN, a citizen of the United States, residing at Bridgeport, in the county of Fairfield and State of Connecticut, have invented a certain new and useful composition of matter to be used as a Water-Proof Preservative Blacking; and I do hereby declare the following to be a full, clear, and exact description of the invention, such as will enable others skilled in the art to which it appertains to make and use the same.

My composition consists of the following ingredients, combined in substantially the proportions stated, viz: linseed-oil, (either raw or boiled,) one gallon; palm-oil, one quart; tallow, (mutton preferred,) four pounds; gum-asphaltum, (dissolved in one pint turpentine,) one pound; beeswax, one pound; lamp-black, one-fourth pound; gutta-percha, (refined or otherwise, and dissolved in about two gills turpentine,) one and one-half ounce.

I do not desire to limit myself to the exact quantities specified above, as some of them may be varied within reasonable limits without essentially changing the character of the composition.

The linseed-oil may be used either raw or boiled; but ordinarily the boiled oil is preferred. Any kind of tallow may be used; but mutton-tallow is deemed preferable. The gum-asphaltum is preferably cut or dissolved in one pint turpentine; but an equal quantity of benzine may be used, or, if preferred, any other well-known solvent may be substituted.

Refined gutta-percha is considered preferable in this composition; but an inferior quality may be used without departing from the spirit of my invention. The gutta-percha is most easily dissolved in about two gills of turpentine; but benzine or any other solvent may be substituted.

If preferred, caoutchouc or common india-rubber may be substituted for the gutta-percha in substantially the quantity specified.

This composition combines numerous qualities not heretofore found in any composition known to the trade. When prepared, ready for use, it is nearly of the consistency of tallow, but will be found soft enough without heating for convenient application with a brush, swab, or with the hand. The article to which it is to be applied should not be wet, nor should it be thoroughly dry. After the application of the polish the article to which it is applied should stand for a short time before being used. The effect of this composition will be to prevent cracking, to preserve the leather, and render it absolutely water-proof. It may be used upon any article made of leather—such as harnesses and heavy boots—but will be found equally valuable upon ladies' and children's shoes, or upon fine calf-skin boots and shoes. The composition is of itself a polish, and after standing a short time will not rub off or soil clothing. If it should be deemed desirable, however, ordinary paste-blacking may be used over my water-proof polish. The paste may be applied as easily and will polish as readily as if the water-proof polish had not been used. This, so far as I am aware, is not true of any similar composition that has yet been produced.

I am aware of another composition containing india-rubber, gutta-percha, old rubber, unrendered beef-tallow, neat's-foot oil, beeswax, lamp-black, resin, and spermaceti; but this compound differs in every respect from mine.

What I claim, and desire to secure by Letters Patent of the United States, is—

A composition consisting of linseed-oil, palm-oil, tallow, gum-asphaltum, beeswax, lamp-black, and gutta-percha, combined in substantially the proportions specified.

In testimony whereof I affix my signature in presence of two witnesses.

JOHN A. VAN KEUREN.

Witnesses:
F. H. SANFORD,
W. J. HAVILAND.